(12) United States Patent
Yuan et al.

(10) Patent No.: US 8,937,935 B2
(45) Date of Patent: Jan. 20, 2015

(54) METHOD FOR COMMUNICATING IN A NETWORK COMPRISING A BATTERYLESS ZIGBEE DEVICE, NETWORK AND DEVICE THEREFOR

(75) Inventors: Wei Yuan, The Hague (NL); Ludovicus Marinus Gerardus Maria Tolhuizen, Eindhoven (NL); Bozema Erdmann, Eindhoven (NL); Stephan Schlumbohm, Frankfurt am Main (DE)

(73) Assignee: Koninklijke Philips N. V., Eindhoven (NL)

( * ) Notice: Subject to any disclaimer, the term of this patent is extended or adjusted under 35 U.S.C. 154(b) by 218 days.

(21) Appl. No.: 13/505,581

(22) PCT Filed: Nov. 2, 2010

(86) PCT No.: PCT/IB2010/054946
§ 371 (c)(1),
(2), (4) Date: May 2, 2012

(87) PCT Pub. No.: WO2011/055292
PCT Pub. Date: May 12, 2011

(65) Prior Publication Data
US 2012/0224571 A1  Sep. 6, 2012

(30) Foreign Application Priority Data

Nov. 9, 2009  (EP) .................................. 09306072

(51) Int. Cl.
*H04W 40/02*    (2009.01)
*H04L 12/56*    (2006.01)
(Continued)

(52) U.S. Cl.
CPC ........... *H04L 12/4633* (2013.01); *H04W 40/04* (2013.01); *H04W 40/12* (2013.01); *H04W 80/02* (2013.01); *H04W 84/18* (2013.01); *H04W 88/182* (2013.01)
USPC ............................ 370/349; 370/328; 370/389

(58) Field of Classification Search
CPC ........ H04W 40/04; H04W 40/12; H04W 80/02; H04L 12/4633
USPC ....................... 370/328–349, 395.4
See application file for complete search history.

(56) References Cited

U.S. PATENT DOCUMENTS 7,286,520 B2 * 10/2007 Takeda et al. .................. 370/349
8,538,433 B2 * 9/2013 Kekki et al. .................... 455/436
(Continued)

FOREIGN PATENT DOCUMENTS

CN       1433195 A     7/2003
JP     2008510350 A    4/2008
(Continued)

OTHER PUBLICATIONS
Zigbee Alliance: "Zigbee Specification 2007-Chapter 3.6"; Internet Citation, Jan. 2008, pp. 347-417, Retrieved From The Internet: URL:http://www.zigbee.org [retrieved on Aug. 19, 2009].

*Primary Examiner* — Afsar M Qureshi
(74) *Attorney, Agent, or Firm* — Yuliya Mathis

(57) ABSTRACT

A system for wireless communication in a network includes: a resource-restricted device transmitting a data frame to be forwarded to a destination device in the network, wherein the data frame includes a source identifier of the resource-restricted device, wherein the source identifier is not a valid network address for the network; a proxy device receiving the data frame from the resource-restricted device, deriving a network address for the resource-restricted device as a function of the source identifier of the resource-restricted device, and constructing, from the data frame, a packet to be forwarded to at least the destination device. Constructing the packet involves: including, in the packet, data from the data frame, and including, in the packet, the derived network address for the resource-restricted device as a source address for the packet. The proxy device associates a delay to the packet, and schedules transmission of the packet after the delay.

20 Claims, 1 Drawing Sheet

(51) Int. Cl.
*H04L 12/46* (2006.01)
*H04W 40/12* (2009.01)
*H04W 40/04* (2009.01)
*H04W 80/02* (2009.01)
*H04W 84/18* (2009.01)
*H04W 88/18* (2009.01)

(56) References Cited

U.S. PATENT DOCUMENTS

| | | | |
|---|---|---|---|
| 2004/0165532 A1* | 8/2004 | Poor et al. | 370/238 |
| 2005/0180447 A1* | 8/2005 | Lim et al. | 370/432 |
| 2006/0154598 A1* | 7/2006 | Rudland et al. | 455/3.01 |
| 2006/0274671 A1* | 12/2006 | Budampati et al. | 370/254 |
| 2007/0121521 A1 | 5/2007 | D'Amico et al. | |
| 2007/0270096 A1 | 11/2007 | Nozaki | |
| 2008/0205385 A1* | 8/2008 | Zeng et al. | 370/389 |
| 2009/0010205 A1* | 1/2009 | Pratt et al. | 370/328 |
| 2009/0141688 A1* | 6/2009 | Leung et al. | 370/331 |
| 2009/0180430 A1* | 7/2009 | Fadell | 370/329 |

FOREIGN PATENT DOCUMENTS

| | | |
|---|---|---|
| WO | 2006016540 A1 | 2/2006 |
| WO | 2008099308 A2 | 8/2008 |

* cited by examiner

METHOD FOR COMMUNICATING IN A NETWORK COMPRISING A BATTERYLESS ZIGBEE DEVICE, NETWORK AND DEVICE THEREFOR

FIELD OF THE INVENTION

The present invention relates to a method for communicating in a wireless control network. More particularly, the present invention relates to a method for ensuring maintenance of correct communication between a communication device and a destination device in a wireless network.

This invention is, for example, relevant for wireless networks comprising resource-restricted devices having low power resources. In a specific application, the present invention is relevant for wireless networks using communication protocols compliant with the IEEE802.15.4 and also IEEE802.15.4-based protocols, e.g. ZigBee protocol, especially the ZigBee Green Power protocol.

BACKGROUND OF THE INVENTION

Wireless control networks have recently become a ubiquitous trend in the field of communication and connectivity/automation, especially for building management systems. Wireless technologies present major advantages in terms of freedom of device placement, device portability, and installation cost reduction, since there is no need for drawing cables and drilling. Thus, such technologies are particularly attractive for interconnecting, sensing, automation, control or monitoring systems using sensor devices such as light switches, light dimmers, wireless remote controllers, movement or light detectors, window or door openers, that have to be set up in distant places one from the other and from the devices they control, e.g. lights.

One of the drawbacks appearing in networks of the like relates to device powering. Indeed, since the devices are not wired, they can not receive power necessary for performing all the operations required in the network from the mains or via the connection with the controller. Thus, it has been envisaged to equip such devices with built-in batteries. However, since the devices are quite size-restricted, batteries may not be of a large size, which results either in a reduced device lifetime, or in labour intensive battery replacement.

It has been suggested to remedy this issue by equipping sensor devices with self-sustained energy sources that harvest energy from its environment or from the interaction with the user. Still, the amount of energy achievable by off-the-shelf energy harvesters is very limited, which means that the features and functions of the batteryless devices are heavily restricted.

Among the functions that are mandatory for good operation in a wireless network is the maintenance of correct communication, which makes it possible to ensure at any time that a resource-restricted device is linked to a router which forwards messages on its behalf. In existing implementations therefore, a parent-child relationship is established between a device, generally resource-restricted, and its parent router. The child end device addresses all its communication to the parent for being forwarded to its final destination. However, especially in case of energy-harvesting device, this relationship creates a single point of failure in the network, because if the parent link is broken, communication from the end device can not be successfully performed anymore. Moreover, in most cases, such a parent link failure may not even be detected by the energy-harvesting end device, due to non-existent or not used receiving circuit on the resource-restricted device, or insufficient energy to wait for, receive, and act upon the feedback. Indeed, since the end device has very limited resources, it can not perform a complete search in order to find a new parent router when the communication is lost, thus operation in the network is compromised, as well as the operation of the end device from the user's perspective.

Existing methods that have been proposed for solving this issue of single point failure imply the usage of broadcast/multicast features which result in high bandwidth consumption, due to multiple devices in a given neighbourhood re-transmitting several times. Then, it may again lead to network overload and as a consequence, result in reduced reliability or temporary failure from a user point of view.

SUMMARY OF THE INVENTION

It is thus an object of the invention to propose a method that allows maintaining correct communications between a resource-restricted device and a wireless network, without creating single point of failure and without involving too much power spending by a resource-restricted device originating a communication, for example a battery-less device.

It is also an object of the invention to propose a method for communicating in a network that reduces the involvement of the resource-restricted device in link maintenance as much as possible.

Yet another object of the invention is to provide a method for communicating that allows dealing with duplicate messages.

Yet another object of the invention is to provide a method that is simple, reliable, and cost-efficient, also in terms of overall bandwidth usage.

Yet another object of the invention is to allow for high-reliability applications, by the destination device transmitting an acknowledgement packet, and the proxies to retry on its lack, and try to re-establish the communication path to the destination on repetitive lack of an acknowledgement frame.

To this end, the invention proposes a method for wireless communication in a network comprising a resource-restricted device, and at least one proxy device, wherein the method comprises the following steps:

- the resource-restricted device (ZGPD) transmitting a frame containing source identifier to be forwarded to a destination device in the network,
- the proxy device (ZP5) receiving the frame,
- the proxy constructing, from the frame, a packet to be forwarded to the destination device,
- the proxy device associating a delay to the packet and scheduling forwarding of the packet after this delay,
- wherein the step of constructing a packet from the frame comprises deriving source-related information from the received frame and including this information in the packet.

In all the specification, the terms proxy, resource-rich device, and router will be used interchangeably.

Thus, a method according to the invention is such that the end device does not need to be pre-configured with the identity of the proxies, neither does it have to track them. Additionally, the proxies do not need to be pre-configured either with the identity of the resource-restricted device on behalf of which they should forward the data. Furthermore, the amount of dedicated communication between several proxies capable of forwarding on behalf of each resource-restricted device is reduced to zero.

A resource-restricted device, also called end device, within the meaning of the present invention, relates to a communicating device that is restricted at least in terms of energy-resources, acting as a reduced functionality device in the network. Such a method makes it possible for an end device to communicate in a network without any need for the end device to be pre-configured with or discover the identity of the proxy, since the end device transmits a frame to be forwarded without having to know the identity of the router device that will handle the transmission. Furthermore, this method allows the proxy to assume its responsibility without earlier pre-configuration with the end device's identifier. Thus, sending the frame is the only action performed by the end device, which means that power consumption is reduced to a minimum.

This method also solves the previously mentioned issue of non-detected failure in the network, since proxy devices are not pre-assigned to the resource-restricted devices in advance but assigned on the fly in an ad-hoc manner.

In an advantageous embodiment, the step of deriving source-related information comprises:
determining a source address as a function of the resource-restricted device source identifier,
including the source address of the resource-restricted device in the packet to be forwarded.

In another embodiment, the step of deriving source-related information also comprises:
determining a sequence number, based on the reception time of the frame,
including the sequence number in the packet to be forwarded.

The sequence numbers are usually handled individually by each transmitting device. However, in the case where several proxies need to appear as one device, the sequence numbers used by each proxy for forwarding independently to the destination device need to be aligned, for the destination device to be able to filter out duplicate messages forwarded by different proxies. Preferably, this should be achieved without requiring dedicated communication protocol between the proxies. This can be achieved by using the sequence number from the ZGPD frame, if present and incremental. This however is not likely, because it requires the ZGPD to store the sequence number in non-volatile memory. Alternatively, if ZGPD uses random numbers as a sequence number, still two consecutive packets may carry the same sequence number, leading to the second frame being erroneously dropped as a duplicate.

Thus, in case incremental sequence numbers are not available, the sequence number for forwarding should preferably be derived from the sequence number in the ZGPD packet, and the repetition counter in the ZGPD packet, indicating which of the n repetitive transmissions is currently being received by the proxy. For example, in the specific embodiment of ZigBee Green Power frame, the repetition counter can be carried in either the MAC layer frame control field or NWK layer frame control field. With 3 repetitions envisaged, a 2 bit field would be enough. In case more repetitions would be required/possible with the available energy budget, any higher number of repetition could be indicated by the highest available value.

Alternatively, if no source of randomness is available on the ZGPD, the proxies should derive the sequence number for the to-be-forwarded packet from the reception time of the packet; for increased precision or relaxing the requirement on the clock properties of the proxies, repetition counter could be used as well, to allow the proxies to calculate back the time of reception of the same repetition (e.g. first repetition) of the ZGPD frame, and derive the sequence number for the to-be forwarded packet from that.

Usually, devices use their own individual addresses as source addresses, when forwarding a packet. However, the resource-restricted device doesn't have an address of a proper format, due to the energy limitations, preventing proper configuration and subsequent address maintenance. However, in the case where several proxies need to appear as one device, the source addresses used by them for forwarding independently to the destination need to be aligned, for the destination to be able to filter out duplicate messages forwarded by different proxies. Preferably, this should be achieved without requiring dedicated communication protocol between the proxies. Thus, each proxy knows an injective function that allows it to derive the same network-valid address from the identifier present in the ZGPD frame.

In this embodiment, the source-identifying data in the forwarded packet is derived from the information in the frame sent by the resource-restricted device, so that whichever proxy forwards the frame to the destination(s), the packets still appears to the destination(s) as being sent by the same device, thus allowing for duplicate filtering.

In an advantageous embodiment of the present invention, the method further comprises the step of determining the delay associated to the data frame as a function of reception quality of the frame.

For example, the delay can be determined as a function of the ZigBee Link Quality Indicator of the router.

In a specific embodiment, this delay is determined independently by each proxy, either:
as being inversely proportional to the Link Quality Indicator of the link between the resource-restricted device and this particular proxy, or more generally,
in such a way that a higher value of the link quality indicator results in a smaller delay.

For example, is the LQI can take values between 0 and 255 (as the ppduLinkQuality reported by the IEEE 802.15.4 PHY layer), the delay could be calculated as delay=150−20*|LQI/60| ms, where || indicates integer part.

Indeed, by having a smaller transmission delay with a larger LQI, the proxy with the best reception of the message from the end device is automatically elected master, and forwards the message to the ZigBee network first.

However, in a large network comprising many proxies, multiple ones may receive the packet directly from the same resource-restricted device, and some of them still with equal LQI values. Thus, in order to avoid that proxies send their packet simultaneously and thus cause a packet collision, it can be useful, in some embodiments, to introduce a random element in the delay. In this view, in some embodiments, the step of determining the forwarding delay further comprising adding a random jitter amount to the delay determined as a function of the Link Quality Indicator. This random jitter amount is generally small, and bounded by a maximum value, e.g. ZigBee nwkMaxBroadcastJitter. This maximum value is, in an advantageous embodiment, smaller than the absolute value of the difference between the nominal back-off times corresponding to the different LQI values. This boundary ensures that a packet received with a quality LQI1, better than a quality LQI2, will always be forwarded before a packet received with a quality LQI2. In some other embodiments, the application relies on lower layers to add random delay.

To limit the overall amount of data and maintenance traffic to the network, further criteria for determining the delay may include one or a combination of the following:
(i) availability of the information about intended destination(s) of the packet derived from the received frame,
(ii) availability of the routing path to the destination(s) of the packet derived from the received frame;
(iii) fact of being early/late to forward in the past.

For example, the delay could be increased by 500 ms if the destination is not known; or by 200 ms if the destination is known but route to the destination(s) is not established; and the delay could be decreased by 20 ms, if the proxy did forward the previous packet.

To further limit the number of packets forwarded independently to the destination by the proxies, the fact of the proxy being located on the routing path from the destination, i.e. the one of the many proxies responding to the derived address, to which the routing algorithm finds the lowest-cost path as seen from the destination, may be taken into account. This proxy may subtract additional amount from the scheduled delay. For example, e.g. delay=150−20*|LQI/60|−50*ON_PATH[ms], where
|| indicates integer part;
LQI can take values between 0 and 255;
ON_PATH is a Boolean flag, set to 1 if the proxy is located on the path from the destination to the derived address.

In some cases, it may happen that the address generated during construction of the packet already exists in the network. Thus, in one embodiment, despite the conflict detection and resolution scheme that may be part of the network address assignment procedure used as it is the case in ZigBee, the proxies should stick to the derived address and allow the other conflicting device to pick another address.

In another embodiment, the method comprises the step, in case the router device hears that the data frame has been forwarded by another router device in a packet, of cancelling the scheduled transmission of further packets corresponding to the same data frame.

However, in some cases, it might happen that a proxy cannot hear such a previous message, e.g. because it is out of radio range of the previously transmitting proxy. In such a case, the destination device receives two packets. Thanks to the derived sequence number and the derived ZigBee network address inserted in the data frame, the destination device can determine that the two packets represent duplicates of a single message.

Moreover, some high-reliability applications may require an acknowledgement packet to be sent back from the destination to the source, e.g. to provide the user with the confirmation on the performed action, or to achieve the required reliability level, i.e. to allow the source to re-try on the lack of the acknowledgement. However, multiple proxies pretending to be one device are multiple potential destinations for such an acknowledgement.

Thus, in some embodiments, a method according to the invention comprises one or several of the following features:
- the proxies know an injective function for deriving an IEEE address from the resource-restricted device's identifier;
- the proxies respond to service, device and route discoveries addressed to the address derived from the ZGPD identifier (using the IEEE address, where appropriate, to avoid appearing like an address conflict);
- in case the proxy device receiving an acknowledgment from the destination device, of cancelling scheduled transmission of the packet;
- in case the proxy not receiving any acknowledgement from the destination device after a predetermined duration, of maintaining scheduled retransmission of the packet;
- optionally, the method further comprises the step of:
  forwarding the destination's ACK as MAC broadcast/ MAC unicast to the derived address, so that it reaches other (neighbour) proxies;
  in case the proxy not receiving any acknowledgement from the destination device, directly or via the neighbor proxies, of attempting re-establishment of communication path to the destination.

Another aspect of the invention relates to a router device, acting as a proxy, comprising:
  reception means for receiving a data frame from an resource-restricted device in a wireless network,
  transmission means for forwarding the data frame towards a destination device in the network, as part of a packet,
  determination means for determining, from a Link Quality Indicator of the packet reception, a forwarding delay of the packet.

Such a device might comprise, in a specific embodiment, means for transforming received ZigBee Green Power frame to be forwarded ZigBee packets. Indeed, in one specific embodiment, resource-restricted frame is ZGP frame and the forwarded packet is standard ZigBee packet and thus proxy is capable of this translation.

Another aspect of the invention relates to a ZigBee Green Power frame comprising a source identifier of an originating resource restricted device, wherein the frame format comprises a MAC layer frame control field or in a NWK layer frame control field, and the frame further comprises a repetition counter included in one of the MAC layer frame control field and the NWK layer frame control field.

In a specific embodiment, the router further comprises means for canceling a scheduled transmission of a data frame when hearing that the data frame has been transmitted by another router device.

These and other aspects of the invention will be apparent from and will be elucidated with reference to the embodiments described hereinafter.

BRIEF DESCRIPTION OF THE DRAWINGS

The present invention will now be described in more detail, by way of example, with reference to the accompanying drawings, wherein.

DETAILED DESCRIPTION OF THE INVENTION

Figure 1:
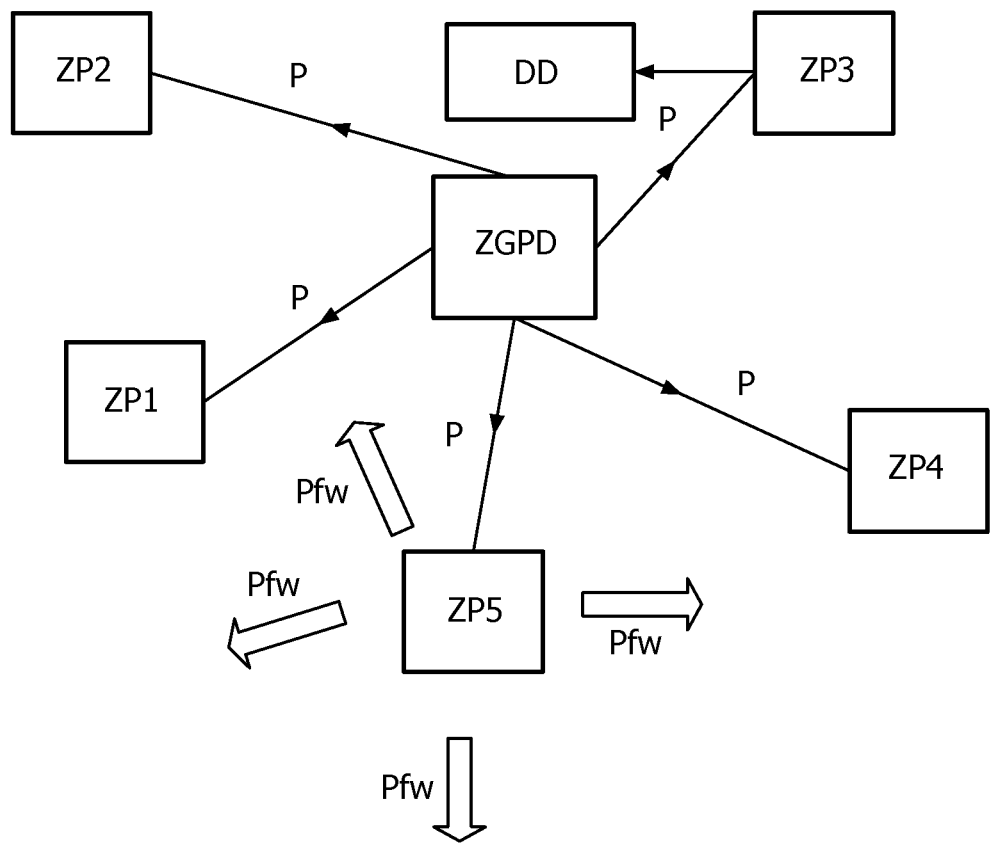
FIG. 1 shows a network according to the invention

The present invention relates to a method of communicating in a wireless control network as shown in FIG. 1. The network comprises a resource-restricted device and a destination device DD. This first device is, for example a ZigBee Green Power Device (ZGPD), but the invention finds application with any resource-restricted wireless device, especially battery-powered or energy-harvesting devices, such as light switches, light dimmers, wireless remote controllers, movement detectors, light detectors, shutter controllers, window/door openers, etc. The network also comprises several proxy devices (ZP1, ZP2, ZP3, ZP4, ZP5). These proxy devices are, in an exemplary embodiment, compliant with both the ZigBee Green Power communication protocol, as well as ZigBee communication protocols. In another advantageous embodiment, the resource-restricted device and the proxies are compliant with other lightweight 802.15.4-based ZigBee protocol.

In a network of the like, a ZigBee Green Power Device transmit several times the same message, so as to increase the probability that the message is correctly received by the destination device. In some particular embodiments, but not mandatorily, the ZGPD is initially configured in such a way that the time interval between the first transmission and the last transmission of a message is much smaller than the time elapsed between the last transmission of a message and the 1$^{st}$ transmission of the next message. This makes it possible for the ZGPD proxies, or routers, to distinguish a different message from the different transmissions of the same message, and thus to handle duplicates in a correct way.

Moreover, the routers, or proxies (ZP1, ZP2, ZP3, ZP4, ZP5) situated in the radio range of the ZGPD are configured as follows:

They have an injective function f, for mapping the ZGPD source identifier of the resource-restricted device sending a packet to a source ZigBee address that can be recognized all over the ZigBee network, They comprise means for determining the destination of a ZGPD packet from the ZGPD address; these means for determining the destination comprise, for example:

Check-up means for looking at a table included in the proxy, or

Deriving means for determining directly the control GroupID from the ZGPD source identifier They comprise a sequence number generator exclusive to ZGPD packets. This means that all proxies in the vicinity of the ZGPD generate the sequence number from the reception of the ZGPD packet in the same way, which makes it possible to correctly handle duplicate packets at the destination because they comprise the same sequence number, In a network according to the invention, the router devices are not configured in advance so as to be linked to a particular resource-restricted device. Actually, the routers decide among themselves on the proxy role on the fly in an ad-hoc manner each time a data frame has to be transmitted, without the need of dedicated communication.

A communication in the network is initiated by the ZGPD. For example, a user interaction with the ZGPD, a ZGPD-implemented sensor event or an internal timer may trigger transmission of a data frame by the ZGPD. This frame is, in an exemplary 802.15.4/ZigBee embodiment, transmitted through the MAC layer by using MAC broadcast or indirect communication, without any notion of intended destination. In another embodiment, still in 802.15.4/ZigBee network, the frame contains appropriate addressing in the higher layers, e.g. NWK or application support sub-layer (APS), i.e. unicast for contacting single device, multicast for contacting a group of devices or broadcast for contacting all devices. Thus, the knowledge about the final destination of the ZGPD's packet may be stored in the ZGPD and included in the packet sent by the ZGPD, or preferably handled by the proxy and thus added when forwarding the frame. In a specific embodiment of the latter case, the proxy/proxies can obtain this information in the commissioning process and, if required, distribute it in the network, as known in the art.

All routers ZP1, ZP2, ZP3, ZP4 and ZP5 situated in the radio range of the ZGPD thus receive the frame from ZGPD, or packet P. In an optional embodiment, the routers check whether this packet actually comes from a ZGPD. This can be achieved for example by including device type information in the packet, e.g. in form of a flag, identifier from within a pre-defined address pool or the used frame format.

Then, each router repackages the ZGPD packet into a ZigBee packet that includes:

A ZigBee address determined from the ZGPD identifier, by using a function, for example injective, included in the router, An APS (and optionally also NWK) sequence number determined, based on the reception time, by using the sequence number generator.

Then each router schedules forwarding of the packet after a predetermined delay. The maximum delay corresponds, for example, to a time window in a broadcast protocol method. The delay is determined based on the Link Quality Indicator, as previously explained. It can also be modified by taking into account the router's knowledge of the intended destination, the existence of a valid route to the destination, the fact of the router being located in the reverse path from the destination and/or the fact of being early to forward in the past. It can further be modified by adding a random jitter.

Let's assume that router ZP5 is the one having associated the shortest delay. Then, at a timeout, router ZP5 transmits the packet ($P_{FW}$) to the destination. Some of the other routers in the radio range of ZP5, namely ZP1 and ZP4, may have the means to receive the packet $P_{FW}$ forwarded by router ZP5, and thus may cancel their scheduled transmission, to avoid multiple receptions of the data frame at the destination.

However, ZP2 and ZP3 are outside of radio range of ZP5 and thus may not hear that the packet has been transmitted, and then maintain their transmission. Also, ZP1 and ZP4 may not have the means to receive the packet addressed to the destination or may, e.g., experience interference. In such a case, as explained before, the destination device can determine, based on the sequence number and the source network address, whether the two packets received represent duplicates of a single packet, and in such a case cancel all but one of the duplicates.

Furthermore, on reception of the first packet $P_{fw}$, the destination can send an acknowledgement to the derived source address as included in packet $P_{fw}$. Let's assume that ZP3 is located on the path from the destination, i.e. it will receive the acknowledgement from the destination, even in case it didn't yet transmit the scheduled packet. Thus, on reception of the acknowledgement packet from the destination, ZP3 cancels the scheduled packet transmission. Further, it distributes the acknowledgement among the other routers, so that on its reception, ZP1, ZP2 and ZP4 can cancel the scheduled transmissions, and ZP5 can cancel the scheduled re-transmissions.

The invention finds a particular advantageous application with batteryless devices for control networks, esp. lighting control networks, building automation and home automation. Examples of devices include light switch, light remote control, light dimmer, light sensor, and presence detector.

It may also find applications with battery-powered devices in control networks (e.g. ZigBee EndDevices, ZEDs) with limited energy storage, to further optimize their operation and increase their lifetime.

In the present specification and claims the word "a" or "an" preceding an element does not exclude the presence of a plurality of such elements. Further, the word "comprising" does not exclude the presence of other elements or steps than those listed.

The inclusion of reference signs in parentheses in the claims is intended to aid understanding and is not intended to be limiting.

From reading the present disclosure, other modifications will be apparent to persons skilled in the art. Such modifications may involve other features which are already known in the art of wireless control networks and which may be used instead of or in addition to features already described herein.

The invention claimed is:

1. A system for wireless communication in a network, the system comprising:

a resource-restricted device configured to transmit a data frame to be forwarded to a destination device in the network, wherein the data frame includes a source identifier of the resource-restricted device, wherein the source identifier is not a valid network address for the network;

a proxy device configured to receive the data frame from the resource-restricted device;

the proxy device configured to derive a network address for the resource-restricted device as a function of the source identifier of the resource-restricted device;

the proxy device configured to construct, from the data frame, a packet to be forwarded to at least the destination device, wherein the packet, comprises data from the data frame, and the derived network address for the resource-restricted device as a source address for the packet; and the proxy device configured to associate a delay to the packet, and schedule transmission of the packet after the delay.

2. The system of claim 1, wherein the proxy device determines a sequence number from a reception time of the data frame and the sequence number is included in the packet.

3. The system of claim 1, wherein the proxy device determines a sequence number from a reception time of the data frame and a frame transmission repetition count included in the data frame and the sequence number is included in the packet.

4. The system of claim 1, wherein the proxy device determines a sequence number from a random number included in the data frame and include the sequence number in the packet.

5. The system of claim 1, wherein the proxy device determines the delay as a function of a reception quality of the data frame.

6. The system of claim 1, wherein the proxy device determines the delay as a function of a reception quality of the data frame, combined with a random jitter amount.

7. The system of claim 1, wherein the proxy device determines the delay as a function of a ZigBee Link Quality Indicator.

8. The system of claim 1, wherein the proxy device determines the delay as a function of a ZigBee Link Quality Indicator, combined with a random jitter amount.

9. The system of claim 1, further comprising when a second device in the network already has a network address which matches the derived network address, the proxy device is configured to maintain the derived network address for the packet, and the second device is configured to select a new network address for itself.

10. The system of claim 1, further comprising when the proxy device is informed that the packet has been forwarded by another proxy device, the proxy device is configured to cancel the scheduled transmission of the packet.

11. The system of claim 1, further comprising when the proxy device receives an acknowledgment from the destination device, the proxy device is configured to cancel scheduled transmission of the packet.

12. The system of claim 1, further comprising when the proxy device receives an acknowledgment from the destination device, the proxy device is configured to forward the acknowledgement to another proxy device involved in a process of forwarding the data frame on behalf of the resource-restricted device.

13. The system of claim 1, further comprising when the proxy does not receive any acknowledgement from the destination device or via other proxy devices after a predetermined duration, the proxy device is configured to perform the scheduled transmission of the packet.

14. The system of claim 1, wherein the proxy device comprises a first proxy device among a plurality of proxy devices, the system further comprising:

a second proxy device among the plurality of proxy devices receiving the data frame from the resource-restricted device;

the second proxy device deriving the network address for the resource-restricted device as the function of the resource-restricted device source identifier;

the second proxy device constructing, from the data frame, a packet to be forwarded to at least the destination device, wherein constructing the packet comprises:
  including, in the packet, data from the data frame, and
  including, in the packet, the derived network address for the resource-restricted device as a source address for the packet; and the second proxy device associating a second delay to the packet which is different from the delay associated to the packet by the first proxy device, and scheduling transmission of the packet after the second delay.

15. A proxy device, comprising:

reception means for receiving a data frame from a resource-restricted device in a wireless network, wherein the data frame includes data and a source identifier of the resource-restricted device, wherein the source identifier is not a valid network address for the network;

first determination means for deriving a network address for the resource-restricted device as a function of the source identifier of the resource-restricted device, and including the derived network address in a packet which further includes the data of the data frame;

second determination means for determining, from the reception quality of the frame, a delay for transmitting the packet; and transmission means for transmitting the packet towards a destination device in the network after the delay.

16. The proxy device of claim 15, further comprising means for canceling a scheduled transmission of a packet when the proxy device is informed that the packet has been transmitted by another proxy device or acknowledged by the destination device.

17. The proxy device of claim 15, wherein the proxy device is configured to determine the delay as a function of a reception quality of the data frame at the proxy device.

18. The proxy device of claim 15, wherein the proxy device is configured to determine the delay as a function of a ZigBee Link Quality Indicator.

19. The proxy device of claim 15, wherein the proxy device is configured to determine the delay as a function of a ZigBee Link Quality Indicator, combined with a random jitter amount.

20. The proxy device of claim 15, wherein the proxy device is configured such that when a second device in the network already has a network address which matches the derived network address, the proxy device maintains the derived network address for the packet.

* * * * *